United States Patent [19]

Kunze

[11] 4,346,258
[45] Aug. 24, 1982

[54] CABLE SLEEVE SEALED AT EACH END BY END MEMBERS

[75] Inventor: Dieter Kunze, Neuried, Fed. Rep. of Germany

[73] Assignee: Siemens Aktiengesellschaft, Berlin & Munich, Fed. Rep. of Germany

[21] Appl. No.: 204,550

[22] Filed: Nov. 6, 1980

[30] Foreign Application Priority Data

Nov. 22, 1979 [DE] Fed. Rep. of Germany ....... 2947139

[51] Int. Cl.³ .............................................. H02G 15/08
[52] U.S. Cl. ................................. 174/93; 174/DIG. 8
[58] Field of Search .......... 174/88 R, 91, 93, DIG. 8, 174/92

[56] References Cited

U.S. PATENT DOCUMENTS 4,203,000  3/1980  Muller ................................. 174/192

FOREIGN PATENT DOCUMENTS

| 2005307 | 9/1970 | Fed. Rep. of Germany. |
| 2601811 | 5/1977 | Fed. Rep. of Germany. |
| 2209629 | 11/1978 | Fed. Rep. of Germany. |
| 2731578 | 1/1979 | Fed. Rep. of Germany. |
| 818334 | 2/1937 | France. |
| 1334397 | 6/1962 | France. |
| 2388432 | 12/1978 | France ............................ 174/93 |

Primary Examiner—Roy N. Envall, Jr.
Attorney, Agent, or Firm—Hill, Van Santen, Steadman, Chiara & Simpson

[57] ABSTRACT

A cable sleeve having a tubular sleeve member with an end member sealing each end, each end member having a circumferential flange received on supporting member and sealing means for forming the seal between the tubular member and the sealing member, each of the end members having at least one cable inlet formed by a protuberance of heat shrinkable material having an axial extending separating line common to the flange to form an opening in the protuberance and the flange for insertion of the cable characterized by the edges of the flange being non-joinable and spaced apart by a given width, and a filling member received in sealing engagement between said non-joinable edges to complete the seal. The filling piece, which may either be attached to the cable or be a separate member, preferably is metal and is secured to the edges of the opening by a sealing material. The means for sealing each of the end members or heads with the tubular members preferably includes a circumferential band which is clamped on the flange and supports a sealing element.

9 Claims, 5 Drawing Figures

CABLE SLEEVE SEALED AT EACH END BY END MEMBERS

BACKGROUND OF THE INVENTION

The present invention is directed to a cable sleeve having a tubular member closed at each end by end members which have an axially extending circumferential flange received on a support body and the flange forms a seal with the tubular sleeve. Each end of the end members has at least one cable inlet, which is formed by a protuberance of a heat shrinkable material which has an axial extending separating line which is common with the flange of the member to enable insertion of a cable in the inlet.

In the case of cable sleeves or fittings, the cable introduction is often undertaken in at separate frontal region, a so-called end member or sleeve head of the cable sleeve. A cable sleeve of this type is disclosed in German O.S. No. 27 31 578. As disclosed, the sleeve heads or end members are provided with an axially extending flange and at least one cable inlet which is designed as a heat shrinkable protuberance. The end member is shrinkable only in the region of the cable inlet and the axial extended flange is supported by a divided supporting sleeve or member which engages a connecting web which extends between the flange and the protuberance along each side of a common separating line and enables insertion of the cable into the inlet. The insertion of the cable into the cable inlet particularly in the case of uncut cables occurs by expanding the common separating line or surface that is formed by the web. As can be imagined, the insertion of a particular large diameter cable can occur with only considerable difficulty since the separating line cannot be opened to a substantially large amount. This difficulty becomes greater when several cables must be introduced into the same end member. A widening or respectively bending back of the edges or each of the separating lines or webs is not possible in a random manner. Furthermore, under certain circumstances, additional complications can occur with the sealing at the separating lines or webs in an intensified degree. In this manner, a pulling apart of the cross web regions is conceivable and may result in a permeability along the separating line.

SUMMARY OF THE INVENTION

The present invention is directed to providing an end member for a cable sleeve in which the introduction of the cables to the end member is considerably easier and the obtaining of the desired seal between the end members and the tubular members of the cable sheath is easily obtained. To accomplish these tasks, the present invention is directed to an improvement in a cable sleeve having a tubular member closed at each end by an end member having a substantially cylindrical flange received on a separate supporting member and means for forming a seal between a portion of the tubular member and the flange, each of the end members having at least one cable inlet, each of said cable inlets being formed by a protuberance of a heat shrinkable material having an axial extending separating line which is common with the cylindrical flange to enable introduction of the cable into the inlet. The improvement comprises each of the common separating lines being an axially extending opening having non-joinable edge portions spaced apart a sufficient distance to enable easy insertion of the cable and each of the openings receiving a separating filling member or piece with the non-joinable edges sealingly engaged therewith.

The significance of the invention is that for each of the end members, the cable to be introduced in each case can be introduced with a small amount of force through the common longitudinally extending opening of the cable inlet and the flange of the end member. In this, it is important that only a very slight expansion of the common edges of the opening are required in order to introduce the cable into the cable inlet which are designed as protuberances or longitudinal extending flanges. Too large of an expansion, which was required in the case of a separating line having a closely adjacent edges or webs is no longer necessary and the problems with insufficient expansion of the openings when introducing several cables into several inlets of an end member because of its rigidity are removed. This problem is removed in the case of the end members in accordance with the present invention because the separating line in the region of the inlets are designed as wide openings in which the cable can be introduced more or less with less expanding of the opening. Following this, a filling member or piece is introduced in the longitudinal extending opening or aperture.

The assembly is made still significantly easier if the cables which are to be introduced are provided with the filling member or piece prior to the step of introducing the cable into the inlet. Thus, the filling member or piece is clamped on the cable in the corresponding position with the help of a tightening strap or some other similar clamping arrangement. This makes an additional measure with respect to the supporting or clamping the filling member onto the armor sheath of the cable significantly simplified.

It is also possible that the filling piece or member be provided with fastening means to enable it to be locked or coupled onto the cable, for example, to be connected with the armor or the sheath of the cable. Besides this, the filling member having means enabling fastening will enable forming a connection with a link connected to the filling member of the opposite end member which will enable continuing a ground or electrical connection between the armor sheaths of the two cables entering the cable sleeve at opposite ends. In addition to forming the electrical through connection or ground, the provision of means for connecting or fastening to the length also increases the mechanical rigidity of the cable sleeve to both pulling forces and compressive forces. The arrangement of the filling members, which are connected tightly with the cables in the opening of the inlet, provides a further advantage in that possible torsional forces are transferred at the inlet region so that the sealing region is barely encumbered by such forces.

The filling members or pieces may be connected or fused into the opening of the end member and the walls of the cable inlet which is designed as a protuberance or flange with the help of a sealing adhesive, which is advantageously activated by heat. Thus, it is particularly advantageous if the filling pieces themselves are coated with the corresponding material so that this material can be melted by the heat applied to shrink the protuberance or flange of each of the cable inlets. Since the particular heat conduction is desired to the regions lying on the inside of each of the inlets which regions are not easily accessible, it is desired that the filling member be made of metal to improve the melting process of the adhesive.

The end members can be employed or used with tubular members which are either shrinkable or mechanically lockable tubular members. In the first case, a securing of the end members in the tubular member prior to the heating process is hardly necessary; however, a slight amount of securing is recommended for example by means of a wire lashing on the outer circumference in order to prevent a damaging of the sealing system in case of a later reopening of the cable sleeve. With the use of a mechanically lockable sleeve cylinder which has a longitudinal extending opening shut by a clamping device, a sealing system of a flange-type enveloping is provided on the outer circumference of the flange of the end member between the flange and the tubular member. These envelopings are provided with a sealing groove in which a sealing element is inserted. When the tubular member or sleeve is finally clamped in a closed position, the seal is thus formed between the tubular member and the end members. Also, during reopening of the tubular sleeve or member, the sealing system of the end members will remain untouched.

DESCRIPTION OF THE PREFERRED EMBODIMENTS

Figure 1:
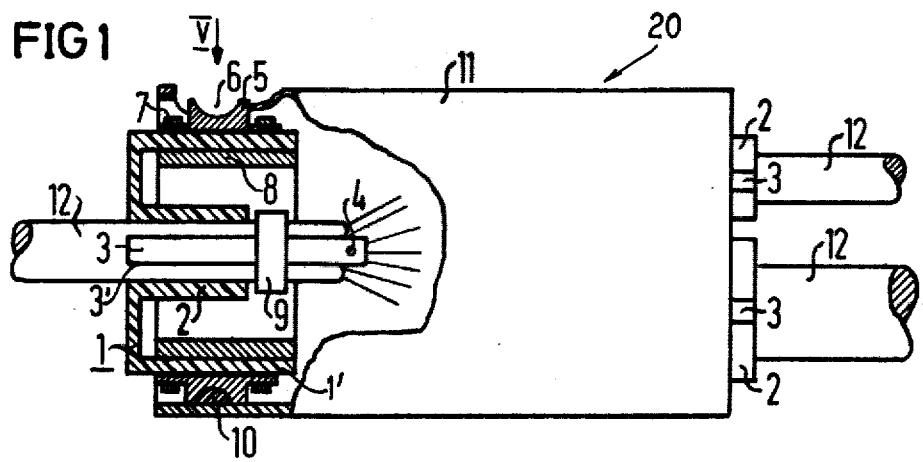
FIG. 1 is a side view of a cable sleeve in accordance with the present invention with portions broken away for purposes of illustration.

The principles of the present invention are particularly useful in a cable sleeve generally indicated at 20 in FIG. 1 for surrounding a connection between cable 12. The cable sleeve 20 is formed by a tubular member 11 which is closed at each end by an end member or sleeve head 1.

The end member 1 has a substantially cylindrical flange 1', which is supported on metal rigid support members 8. Each of the end members 1 have at least one cable inlet, which is formed by a flange like protuberance 2, which is illustrated as extending towards the interior of the cable sleeve 20. It should be noted that the end member 1 could be designed with the protuberance as well as its flange 1' extending towards the exterior instead of towards the interior as illustrated.

Figure 2:
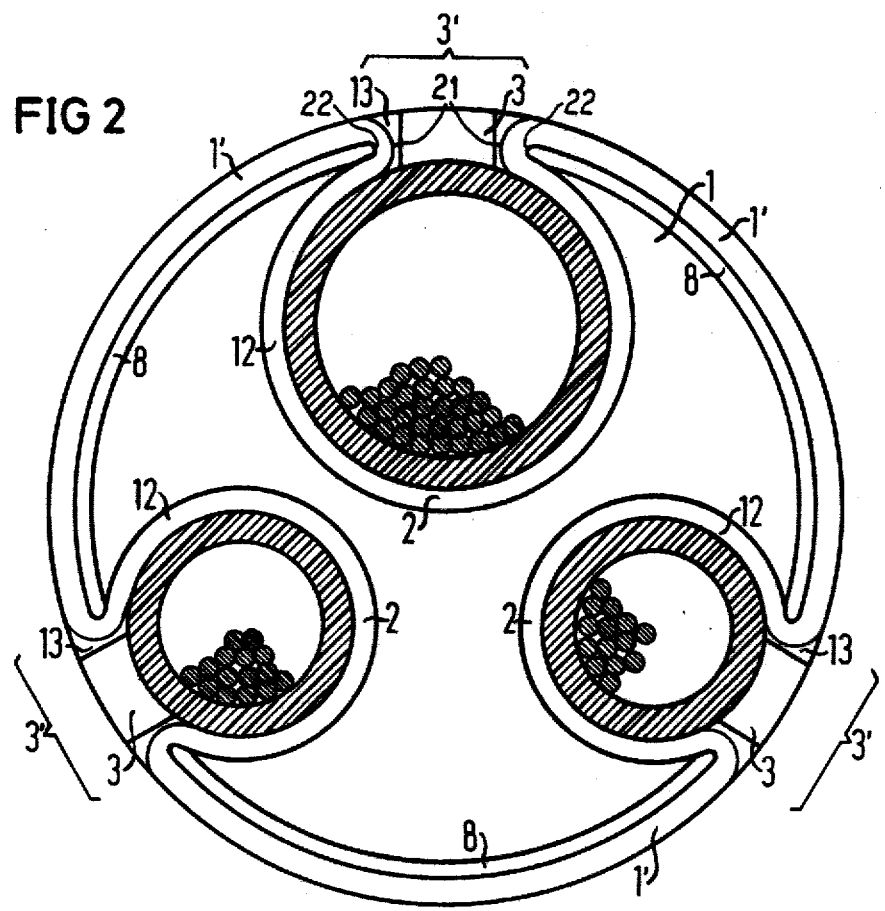
FIG. 2 is an end view of an end member of the present invention.

To enable insertion of a cable 12 into the inlet formed by a protuberance 2, the flanged shaped protuberance 2 has an axially extending opening 3' which is common with the flange 1' as best illustrated in FIG. 2. In fact, the walls of the protuberance 2 merge with the walls forming the flange 1'. As illustrated, the opening 3' has edges 21, which are not joinable due to the width of the opening.

To close each of the openings 3', a filling piece or member 3 is provided. As illustrated in FIG. 1, the piece 3 is clamped on the cable 12 before introduction of the cable with the help of a clamping device or band 9 which may be a tightening strap. At the end of the filling piece or member 3, the piece 3 has fastening means 4 to enable securing the member 3 to the armor sheath of the cable or to a link which may extend along the interior of the cable sleeve 20 to the opposite end member. It is also possible to design the filling member 3 to be so long that it simultaneously can be used as a link between the two cables 12 entering the cable sleeve 20 from opposite ends.

In the embodiment illustrated in FIG. 1, the means for forming a seal between the tubular member 11 is a flange like enveloping or circumferential band 5. The band 5 has a circumferential groove 6, which can receive a sealing element such as element 10 to form a seal with the interior of the tubular member 11. It should be noted that the seal between the band 5 and the exterior of the flange 1' of the end member 1 may be formed by a layer of an adhesive or a layer of a sealing compound. The circumferential band 5 is pressed onto the flange 1' of the member 1 by tightening straps 7. Thus, when the tubular member 11, which has a longitudinal extending opening that is closed by a clamping apparatus (not illustrated) is opened, the sealing system between the end member 1 and the band 5 will remain undisturbed. In the embodiment illustrated in FIG. 1, after the assembly of the sealing means on each of the end members 1, the tubular member 11 is wrapped around the two end members and mechanically locked by means of the longitudinal fasteners to press or hold the interior of the tubular member 11 on the sealing element such as 10.

As best illustrated in FIG. 2, in the region of each of the edges 21 of the longitudinal apertures or openings 3', the wall of the circumferential flange 1' of the member 1 merges into the wall of the projection or protuberance 2 forming the cable inlet. In this embodiment, there is no cross piece or web extending between the side opening of the protuberance and of the flange and the edges 22 of the support bodies or members 8, which are preferably metal, engage a transition area immediately behind the common edges 21 of the aperture region. Thus, during shrinking of the cable inlets onto the cables 12, the cable 12 is pressed against the cylindrical part of the end member 1 since the support members 8 will prevent movement or shifting of the flange 1'.

To close each of the aperture regions or openings 3', the filling member 3 is secured to the edges 21 by the melted adhesive 13 to form a tight closure. The adhesive 13 is preferably provided by coating the member 3 and melts during the heat shrinking process. Therefore, it is desirable that the filling piece 3 consists of metal so that good heat conduction is assured to the region lying on the inside of the cable sleeve 20 to ensure fusion of the sealing adhesive 13. It is also desirable that the circumferential band 5 to be placed on the flange 1 during the heat shrinking process to ensure continuation of the cylindrical shape especially in the area of each opening 3'.

Figure 3:
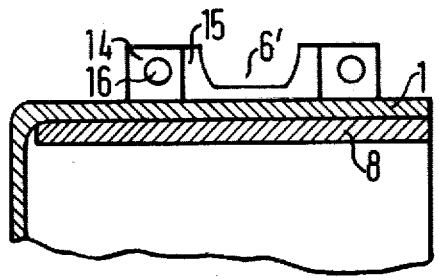
FIG. 3 is a partial longitudinal cross-section of an end member in accordance with the present invention having an embodiment of a cylindrical band.
Figure 4:
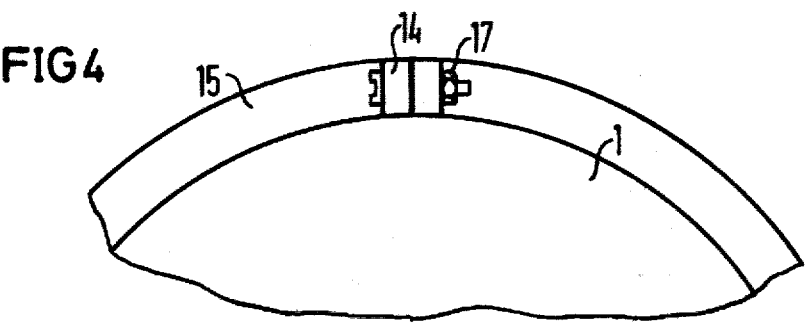
FIG. 4 is a partial end view of an end member with the embodiment of the band of FIG. 3.

FIGS. 3 and 4 illustrate an embodiment of the cylindrical band 5, which is a flange like enveloping or band 15. The band or enveloping 15 is provided with a groove such as the groove 6' and on its ends has flanges 14 with apertures 16 for receiving threaded fasteners such as 17. Thus, by utilizing the fasteners 17, the band 15 can be brought tightly onto the flange 1 of the end member 1.

Figure 5:
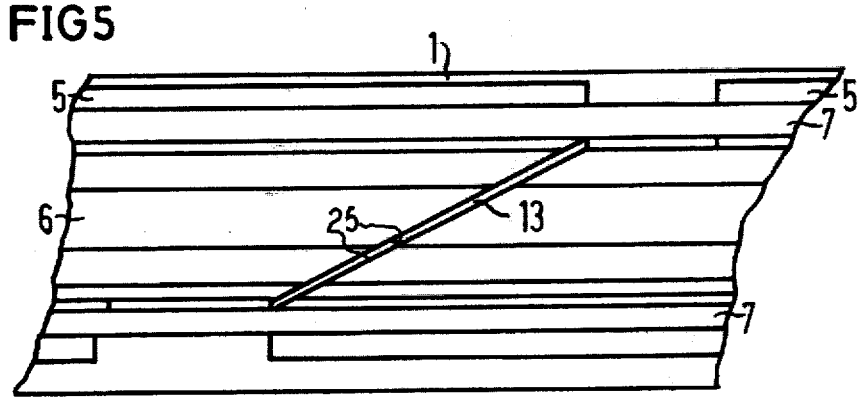
FIG. 5 is a partial side view of the end member as taken from the direction of arrow V in FIG. 1.

As best illustrated in FIG. 5, it is desirable that the band 5 of FIG. 1, which is drawn onto the flange 1' of the member 1 by tightening straps or bands 7, has ends 25 which extend at an acute angle to both the axis of the cable sleeve and also to the plane of the band 5. The edges 25 are spaced apart to provide room to compensate for changes in the circumferential length of the member 1. To complete the seal, a sealing member or element 13 is interposed between the ends 25 and held in tight sealing engagement by the straps 7.

Although various minor modifications may be suggested by those versed in the art, it should be understood that I wish to embody within the scope of the patent granted hereon, all such modifications as reasonably and properly come within the scope of my contribution to the art.

I claim:

1. In a cable sleeve having a tubular member closed at each end by an end member having a substantially cylindrical flange received on a separate support member and means for forming a seal between a portion of the tubular member and the flange, each of said end portions having at least one cable inlet, each of said cable inlets being formed by a protuberance of a heat shrinkable material having an axially extending separating line which is common with the cylindrical flange to enable introduction of a cable into the inlet, the improvement comprising each of the common separating lines being an axial extending opening having non-joinable edge portions spaced apart a sufficient distance to enable easy insertion of the cable, and each of the openings receiving a separate, metal filling member having a coating of heat meltable sealing adhesive, said non-joinable edges of each opening being sealingly engaged with the filling member after the heat shrinking operation.

2. In a cable sleeve according to claim 1, wherein the filling member is secured on the cable inserted into the inlet.

3. In a cable sleeve according to claim 1, wherein the filling member is provided with fastening means to enable securing the filling member to a sheath of the cable.

4. In a cable sleeve member according to claim 1, wherein the filling member is provided with fastening means to enable linking the filling member with a filling member of an end member at the opposite end of the tubular member.

5. In a cable sleeve member according to claim 1, wherein the means for forming a seal between each end member and the tubular member includes a circumferential band member received on the flange of said end member, said band member having means for circumferentially clamping the band member on said flange.

6. In a cable sleeve according to claim 1, wherein the tubular member consists of shrinkable material.

7. In a cable sleeve according to claim 1, wherein the tubular memb?r consists of a non-shrinkable material.

8. In a cable sleeve according to claim 7, wherein the means for forming a seal includes a circumferential band member having a groove for receiving a sealing element, and means for circumferentially clamping the band member on said flange.

9. In a cable sleeve according to claim 8, wherein the ends of circumferential band extends at an angle to the axis of the tubular sleeve and the plane of said band member.

* * * * *